United States Patent
Sliger et al.

(10) Patent No.: US 7,226,351 B1
(45) Date of Patent: Jun. 5, 2007

(54) SMALL GAME GAMBREL

(76) Inventors: Bobby Keith Sliger, 405 N. 9th Ave., Durant, OK (US) 74701; Delores Jane Sliger, 405 N. 9th Ave., Durant, OK (US) 74701

( * ) Notice: Subject to any disclaimer, the term of this patent is extended or adjusted under 35 U.S.C. 154(b) by 15 days.

(21) Appl. No.: 11/337,280

(22) Filed: Jan. 23, 2006

(51) Int. Cl.
*A22C 21/00* (2006.01)

(52) U.S. Cl. .................................................. 452/188

(58) Field of Classification Search ............... 452/187, 452/188, 189, 191, 192; 224/921, 259–260, 224/638, 103; 294/81.56, 74, 137, 142, 81.2, 294/19.1, 19.3, 24, 67.1–67.3, 67.31, 67.32, 294/81.1, 81.21, 81.3, 82.1, 79, 80
See application file for complete search history.

(56) References Cited

U.S. PATENT DOCUMENTS

| | | | | |
|---|---|---|---|---|
| 4,763,942 A | * | 8/1988 | Lyon | 452/192 |
| 4,909,555 A | * | 3/1990 | Blasi | 452/189 |
| 6,250,483 B1 | * | 6/2001 | Frommer | 212/180 |
| D462,416 S | * | 9/2002 | Dallas, Sr. | D22/199 |
| 6,712,687 B1 | * | 3/2004 | Douglas | 452/189 |
| D509,881 S | * | 9/2005 | Waltrip | D22/199 |
| 6,974,374 B1 | * | 12/2005 | Teinert | 452/191 |
| 6,994,618 B1 | * | 2/2006 | Syers | 452/187 |

* cited by examiner

*Primary Examiner*—Thomas Price
(74) *Attorney, Agent, or Firm*—Raymond M. Galasso; Galasso & Associates, LP

(57) ABSTRACT

A low cost, compact, lightweight gambrel is disclosed. The gambrel can have a coupler, a cable, a spreader bar, and six swage sleeves. The coupler can be affixed to a limb of a tree or any other point that is semi rigid and to a loop of the gambrel formed by folding the cable over on to itself and threading the cable through an oval swage sleeve. During a swaging process, a hammer or a press can crimp the swage sleeve such that the sleeve secures the cable. Two holes can be fabricated proximate to the ends of a spreader bar and the cable can be inserted into another swage sleeve and into the holes of the spreader bar. Two more swage sleeves can be swaged on the cable on the bottom side of the spreader bar to hold the spreader bar in place. Two nooses can be formed on the ends of the cable. The nooses can be formed from loops at the end of cable by folding the cable and crimping swage sleeves to form the loop. The cable can then be placed through the loop to form a noose at each termination or end of the cable such loops can act as leg securing members.

12 Claims, 2 Drawing Sheets

SMALL GAME GAMBREL

FIELD OF THE DISCLOSURE

The present disclosure is generally related to systems and methods for hanging animal carcasses to be dressed with a gambrel and further to systems and methods for manufacturing such a hanging system.

BACKGROUND

Many individuals hunt wild game and prepare such game for consumption. Others raise small domestic animals and prepare such animals for personal consumption or dress the animals for purchase by others. Preparation of the carcass of a small animal for eating requires the game to be held properly. Properly holding of the carcass while skinning and butchering greatly simplifies the process and can prevent injury to the preparer. Different types of gambrels for dressing carcasses are available, however most of these holders are relatively large and made for dressing deer and the like. These holders are also relatively heavy and bulky and are not fit for carrying long distances and for dressing small animals. Accordingly, it would be desirable to have an improved system and method for holding small animal carcasses while they are dressed.

DETAILED DESCRIPTION of the DRAWINGS

Hunting is a popular sport for many. Many hunters desire to field dress their kill. It is preferable to perform this job without the help of another person, and dressing the kill for transport or for eating can be an awkward process for one person. In order to skin small game their carcass should be held with the hind legs spread such that the skin can be cut near the hind legs and pulled from the carcass. Gambrels exist for performing such a process but these gambrels are large and bulky and relatively expensive to manufacturer.

In accordance with the present invention, a small game hanger that is light and compact and can fit in a pocket or a pouch of a hunting vest is described. Further it can be appreciated if the small game hanger is efficient to manufacture. A low cost, compact, lightweight gambrel is disclosed. The gambrel can have a coupler, a wire rope or cable, a spreader bar and six swage sleeves. The coupler can be affixed to a limb of a tree or any other point that is semi rigid and to a loop formed in the gambrel. The loop can be formed by folding the cable over on to itself and threading the cable through a swage sleeve twice, then swaging the sleeve. During a swaging process, a hammer or a press can crimp the swage sleeve such that the sleeve secures the cable.

Two holes can be fabricated proximate to the ends of a spreader bar for insertion of the cable. The cable can be inserted into another swage sleeve and then into the holes of the spreader bar. Two more swage sleeves can be swaged on the cable on the bottom side of the spreader bar to secure the spreader bar. Two nooses can be formed on the ends of the cable to provide leg engagement members. The nooses can be created from loops at the end of cable. The loops can be formed by folding the cable and crimping swage sleeves on the cable. The cable can then be placed through the loop to form a noose at each termination or end of the cable.

Figure 1:
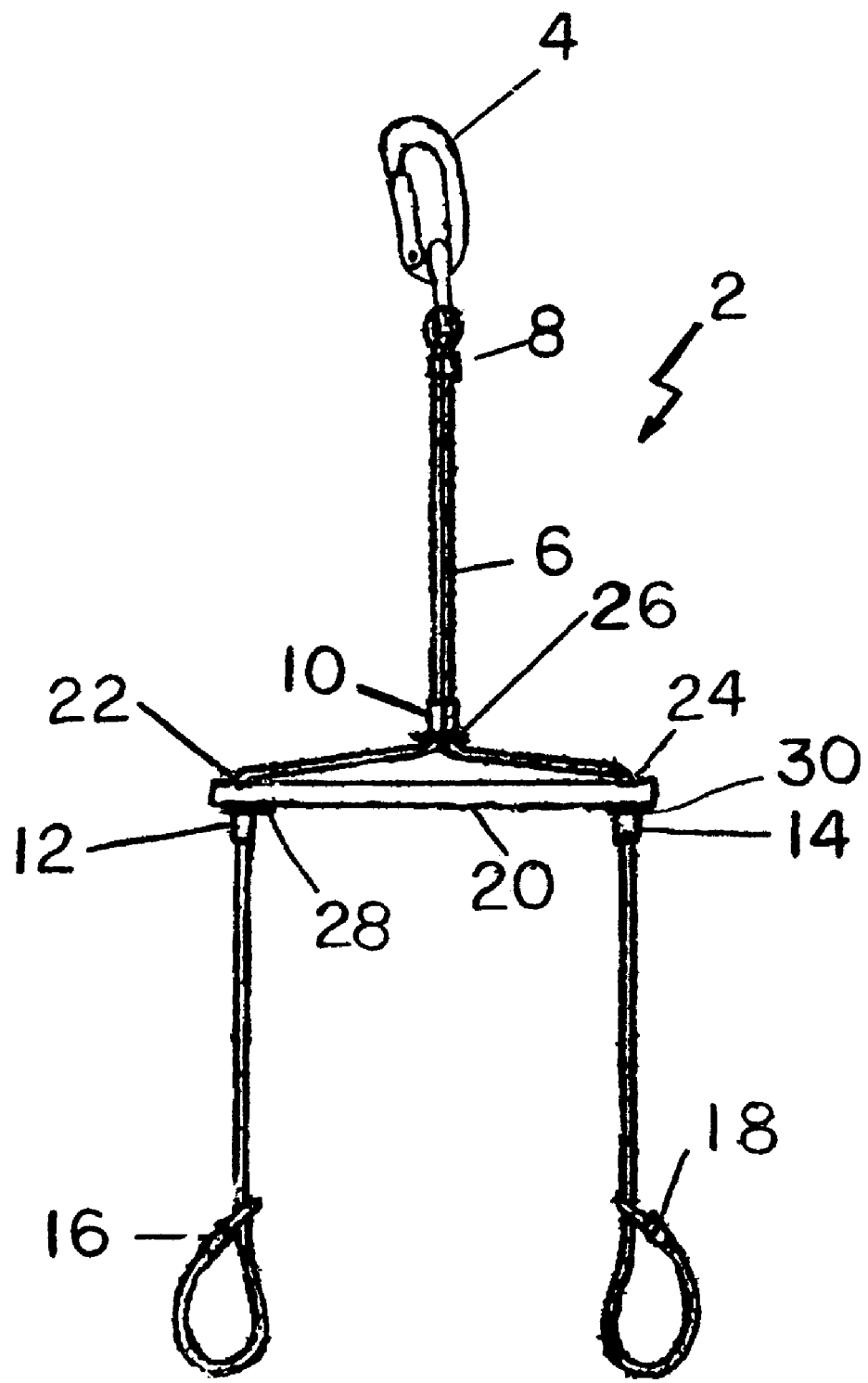
FIG. 1 is an illustration of a small game gambrel in accordance with one embodiment of the present disclosure.
Figure 2:
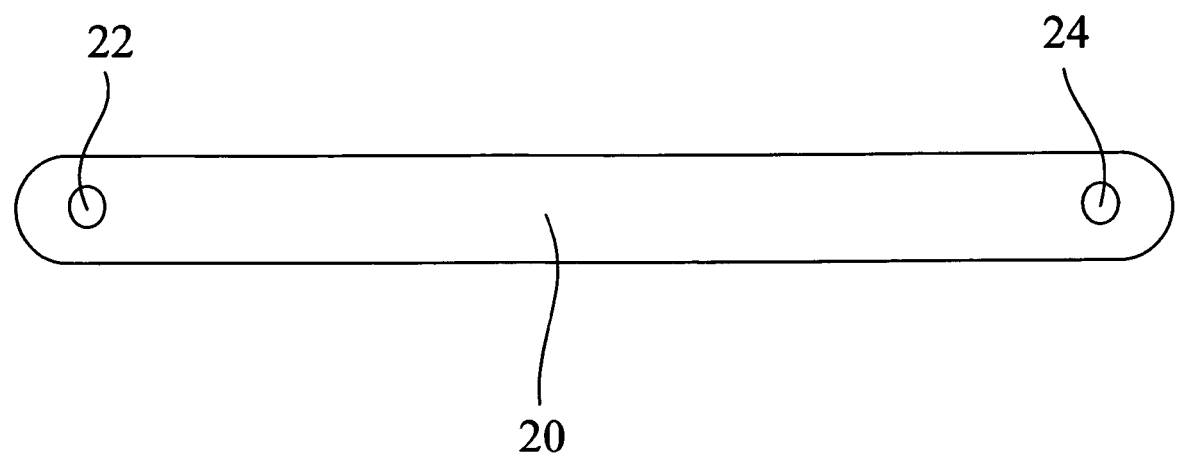
FIG. 2 is an illustration of a top view of the spreader bar of the small game gambrel of FIG. 1 depicting features not visible in FIG. 1, particularly the first and second holes.

FIG. 1 depicts a low cost, compact, lightweight gambrel 2. FIG. 2 depicts a top view of the spreader bar 20 of the small game gambrel 2 of FIG. 1 shown features not visible in FIG. 1, particularly the first hole 22 and second hole 24. The gambrel 2 can have a coupler 4, a cable 6, a spreader bar 20, a first swage sleeve 8, a second swage sleeve 10, a third swage sleeve 12, a fourth swage sleeve 14, a fifth swage sleeve 16, and a sixth swage sleeve 18. In a specific embodiment a single segment of rope can be utilized to manufacture the small game gambrel however, multiple segments or a non-continuous segments of rope would not part from the scope of the present disclosure.

Coupler 4 can be affixed to a limb of a tree or any other point that is semi rigid and will support the gambrel 2 and the weight of small game. Coupler 4 can be an aluminum carabiner type coupler having a spring loaded latch such that the coupler 4 will not come unhooked from the semi rigid point during the dressing process.

A loop 20 can be formed by folding the wire rope or cable 6 over on to itself and threading the cable through first swage sleeve 8. First swage sleeve 8 can be an "oval" swage sleeve, with two through holes that can accommodate to two segments of cable laying tangent to or adjacent to one another. First swage sleeve 8 can be made from steel, copper or aluminum and during a swaging process the first swage sleeve 8 can be smashed, deformed, pinched or crimped by a hammer or a press. The swaging process can "cold flow" the swage sleeve 8 to mate with the rough surface of the outside of the cable 6 thus firmly griping the cable 6. Although the swageable components herein are referred to as sleeves, the components do not need to have a though hole to be considered a sleeve as in some cases a blind hole would also function as a sleeve. Thus, to form the loop for the coupler 4, both ends of the cable 6 can be threaded through the first swage sleeve 8 and when the desire loop dimension is achieved the first swage sleeve 8 can be placed in a tool that presses or swages the sleeve such that the first swage sleeve 8 deforms and pinches the cable.

A first hole 22 can be fabricated in a first end of the spreader bar 20 and a first end of the cable can be fed through the first hole 22 and traverse the spreader bar 20. A second hole 24 can be fabricated in a second end of the spreader bar 20 and a second end of the cable 6 can be inserted into the holes on the spreader bar 20 and exit the other side of the spreader bar such that the cable 6 traverses the spreader bar 20. In other embodiments a large swage sleeve could be crimped over the end of the spreader bar 20 to secure the cable 6 at each end of the spreader bar 20. Other methods could also be utilized to secure the cable to the first and second end of the spreader bar.

A second swage sleeve 10 can be placed over the cable 6 proximate to the spreader bar 20 on a topside or first side of the spreader bar 20. As described above, the second swage sleeve 10 can be swaged or crimped on the cable 6. On a bottom side or a second side of the spreader bar third swage sleeve 12 and a fourth swage sleeve can be swaged on the cable 6. Thus, the second, third and fourth swage sleeves 10, 12, and 14 retain the spreader bar 20 at locations on the cable 6. In other embodiments instead of a swage sleeve a knot or mechanical clamp or other fastening device could be utilized to secure the spreader bar 20 and create loops in the cable 6.

Leg securing members can hang from each side of the spreader bar 20. Leg securing members could be hooks, clamps or a self-tightening system such as a noose. In a specific embodiment a first noose can be formed from a loop at the end of cable 6 by crimping fifth swage sleeve 16 over the cable 6 to create the loop. Another noose for a second leg of the carcass can be manufactured by forming another loop at another end of the cable 6 and crimping sixth swage sleeve 18. The cable 6 can then be placed through the loop to form a noose at each termination or end of the cable 6. A portion of the animal's leg can be placed in the noose and the noose can be tightened such that it tightly grips the leg of the carcasses. Like most nooses, the harder the user pulls on the carcass the tighter the noose can grip the carcass.

In alternate embodiments the cable does not have to be a single piece of cable but can be many different cable segments that are spliced together or terminate at the coupler 4 and/or the spreader bar 20. In a particular embodiment the spreader bar is manufactured from a solid stainless steel bar possibly as small as one quarter of an inch in diameter. The spreader bar could also be manufactured from a plastic material and could be a tube.

In a particular embodiment washers 26, 28 and 30 can be placed on load bearing sides of the swage sleeves 10, 12 and 14. When a quarter inch spreader bar 20 is utilized with a three thirty seconds diameter cable 6, a washer having an inner diameter or less that one half inch, or approximately three eights of an inch can be placed on the cable 6 in the appropriate locations (proximate to the swage sleeves 10, 12, 14) to spread out the load applied to the swage sleeves during use.

The swage sleeves 8–18 can be made of aluminum and can be as small as three thirty seconds of an inch in diameter. It can be appreciated that the gambrel described herein can fold up into a package measuring less than 9 inches by one inch by one inch. For example, the coupler 4 can be removed and the cable 6 can be wound around the spreader bar 20 to form such as compact carrying configuration.

It will be understood that a device as specified by the present disclosure may also be directed to other game skinning application of similar functionality. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A gambrel comprising:
    a cable forming a loop with a first swage sleeve;
    a spreader bar having a hole at a first end and a hole at a second end, the cable traversing the spreader bar at the first hole and at the second hole;
    a second swage sleeve affixed to the cable on a first side of the spreader bar;
    a third swage sleeve affixed to the cable on a second side of the spreader bar;
    a fourth swage sleeve affixed to the cable on the second side of the spreader bar;
    a first noose formed at a first termination of the cable; and
    a second noose formed at a second termination of the cable.

2. The gambrel of claim 1 wherein the cable further comprises more than one cable.

3. The gambrel of claim 1 further comprising a coupler connectable to the loop.

4. The gambrel of claim 1 wherein the spreader bar further comprises a stainless steel spreader bar.

5. The gambrel of claim 1 wherein the spreader bar further comprises a stainless steel tube.

6. The gambrel of claim 1 wherein the spreader bar further comprises a plastic pipe.

7. The gambrel of claim 1 wherein the first noose is formed by swaging a sleeve to the cable to form a loop in the cable.

8. The gambrel of claim 1 wherein the second noose is formed by swaging the cable to form a loop in the cable.

9. A method comprising:
    swaging a sleeve to form a first loop on a cable, the first loop configured to hang a gambrel;
    threading a first end of the cable through a first hole in a spreader bar;
    threading a second end of the cable through a second hole in the spreader bar;
    swaging a sleeve to form a second loop on a first end of the cable;
    swaging a sleeve to form second loop on a second end of the cable.

10. The method of claim 9 further comprising swaging a sleeve on a first side of the spreader bar.

11. The method of claim 9 further comprising swaging a third sleeve and a fourth sleeve on a second side of the spreader bar.

12. The method of claim 9 folding the gambrel into a package measuring less than 9 inches by one inch by one inch.

* * * * *